(12) United States Patent
Mori et al.

(10) Patent No.: US 12,109,944 B2
(45) Date of Patent: Oct. 8, 2024

(54) LIGHTING DEVICE WITH ELONGATED LIGHT GUIDE, HOUSING AND ATTACHMENTS THEREOF

(71) Applicant: TOYODA GOSEI CO., LTD., Kiyosu (JP)

(72) Inventors: Toshiaki Mori, Kiyosu (JP); Yoichi Matsuoka, Kiyosu (JP); Koichiro Endo, Nagoya (JP); Yukihiko Umeda, Kiyosu (JP); Shota Katsuno, Kiyosu (JP); Hiroyuki Asano, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/449,284

(22) Filed: Aug. 14, 2023

(65) Prior Publication Data
US 2024/0101026 A1    Mar. 28, 2024

(30) Foreign Application Priority Data

Sep. 27, 2022    (JP) .................................. 2022-154135

(51) Int. Cl.
*B60Q 3/54* (2017.01)
*B60Q 3/12* (2017.01)
*B60Q 3/64* (2017.01)

(52) U.S. Cl.
CPC ................. *B60Q 3/54* (2017.02); *B60Q 3/12* (2017.02); *B60Q 3/64* (2017.02)

(58) Field of Classification Search
CPC ........ F21S 43/27; F21S 43/235; F21S 43/236; F21S 43/237; B60Q 3/62; B60Q 3/64; B60Q 3/66
See application file for complete search history.

(56) References Cited

U.S. PATENT DOCUMENTS

| 9,266,468 B2 * | 2/2016 | Mizushiro ................ B60Q 3/78 |
| 9,937,858 B2 * | 4/2018 | Katsurayama ......... B60Q 3/217 |
| 11,073,649 B2 | 7/2021 | Okamura |
| 2021/0116620 A1 | 4/2021 | Okamura |

FOREIGN PATENT DOCUMENTS

JP           2021-64560 A      4/2021

\* cited by examiner

*Primary Examiner* — Robert J May
(74) *Attorney, Agent, or Firm* — Posz Law Group, PLC

(57) ABSTRACT

A lighting device includes a light source unit that outputs light, an elongated light guide including a first end surface on which the light is incident, a second end surface located opposite to the first end surface, an emitting surface, and at least one held portion provided on at least one of the longitudinal side surfaces different from the emitting surface, the light guide guiding the light from the first end surface to the second end surface, and a housing including an attachment portion to which the light source unit is attached, a housing portion that is open at an end portion on the attachment portion side and includes a housing recess to house the light guide and an exposure opening exposing the emitting surface, and a holding portion that holds the light guide in the housing recess by sandwiching the at least one held portion.

9 Claims, 11 Drawing Sheets

LIGHTING DEVICE WITH ELONGATED LIGHT GUIDE, HOUSING AND ATTACHMENTS THEREOF

CROSS-REFERENCE TO RELATED APPLICATIONS

The present patent application claims the priority of Japanese patent application No. 2022/154135 filed on Sep. 27, 2022, and the entire contents of Japanese patent application No. 2022/154135 are hereby incorporated by reference.

TECHNICAL FIELD

The present invention relates to a lighting device.

BACKGROUND

A line lighting device is known which includes a light-emitting unit including a light-emitting-unit housing and a light emitter emitting light, a light guide including a light guide main body formed in a rod shape and a light guide flange provided at a first end portion which is one of longitudinal end portions of the light guide main body, and a case including a case main body which is formed in a rod shape, is partially open when viewed in the longitudinal direction and houses the light guide main body therein (see, e.g., Patent Literature 1).

In the line lighting device, the light guide flange is sandwiched between a first longitudinal end of the case main body and the light-emitting-unit housing.

CITATION LIST

Patent Literature

Patent Literature 1: JP 2021/64560 A

SUMMARY OF INVENTION

The line lighting device is not easy to assemble because after the light guide is inserted into the case and until the light-emitting unit is assembled to the case, the light guide may move in a direction opposite to the insertion direction and fall out of the case.

It is an object of the invention to provide a lighting device that allows for improvement in assembly workability.

According to an aspect of the invention, a lighting device comprises:
  a light source unit that outputs light;
  an elongated light guide comprising a first end surface on which the light is incident, a second end surface located opposite to the first end surface, an emitting surface which comprises one of longitudinal side surfaces intersecting the first and second end surfaces and from which the light is emitted, and at least one held portion provided on at least one of the longitudinal side surfaces different from the emitting surface, the light guide guiding the light from the first end surface to the second end surface; and
  a housing comprising an attachment portion to which the light source unit is attached, a housing portion that is open at an end portion on the attachment portion side and comprises a housing recess to house the light guide and an exposure opening exposing the emitting surface, and a holding portion that holds the light guide in the housing recess by sandwiching the at least one held portion.

Advantageous Effects of Invention

According to the invention, it is possible to improve assembly workability.

DESCRIPTION OF EMBODIMENTS

First Embodiment (General Configuration of a Lighting Device 1)

Figure 1A:
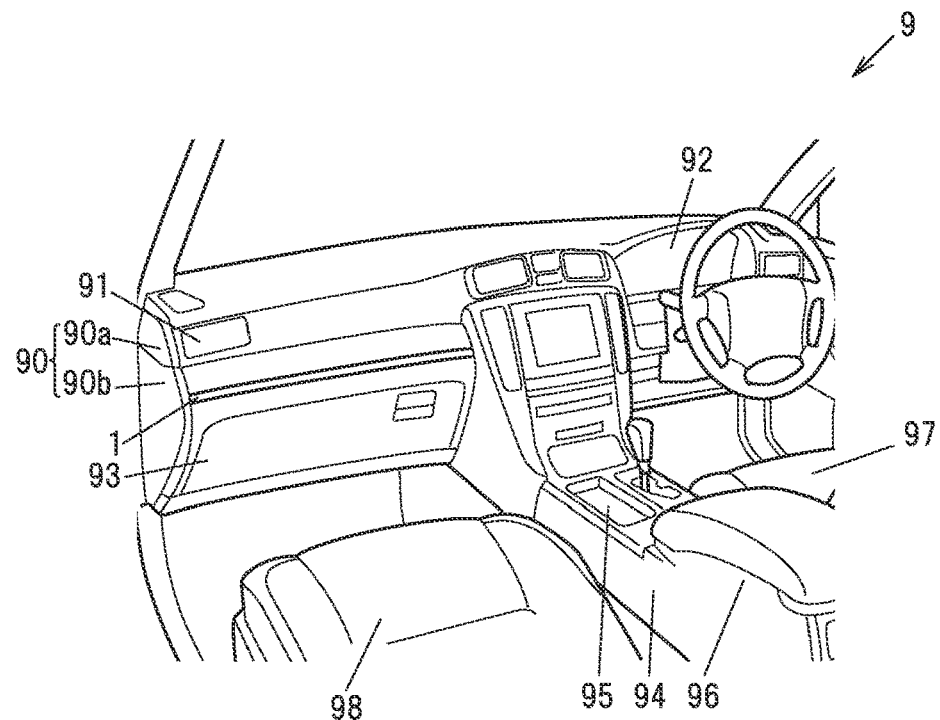
FIG. 1A is an explanatory diagram illustrating the interior of a vehicle to show an example of a position of a lighting device in the first embodiment.
Figure 1B:
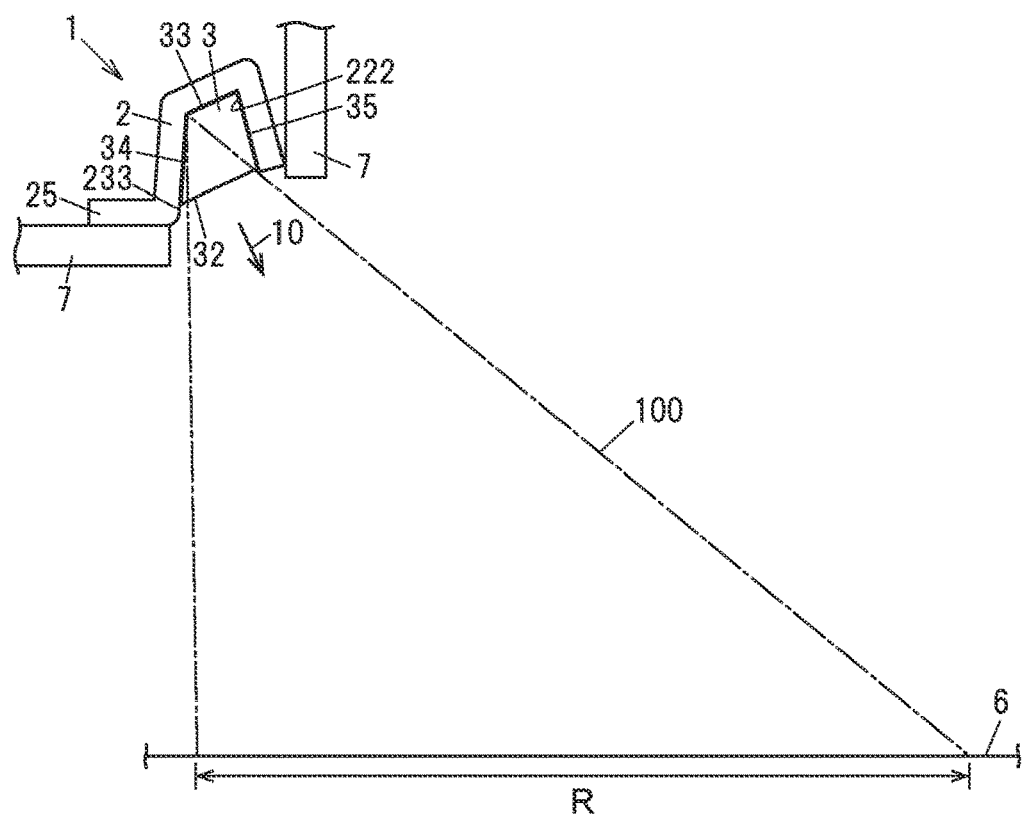
FIG. 1B is a diagram illustrating an example of an illumination area illuminated by the lighting device.
Figure 2A:
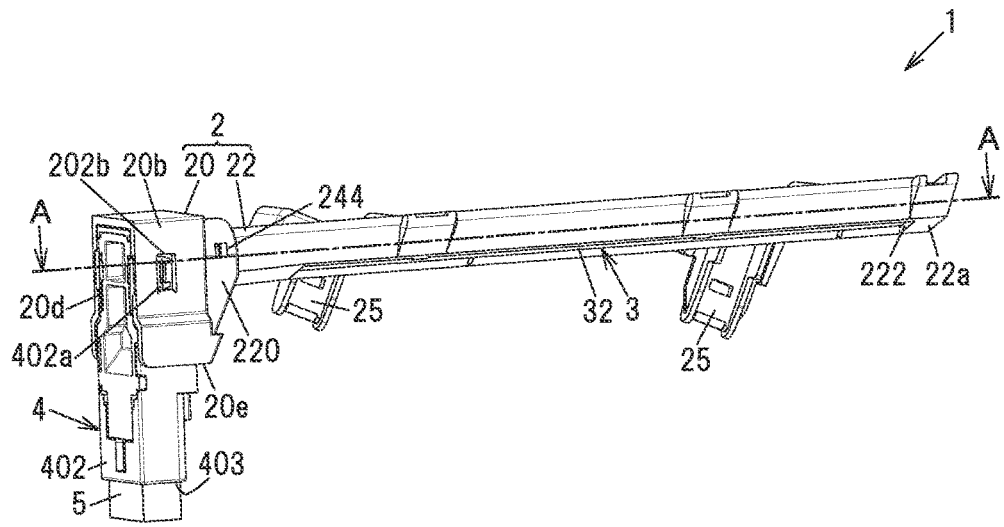
FIG. 2A is a side view showing an example of the lighting device in the first embodiment.
Figure 2B:
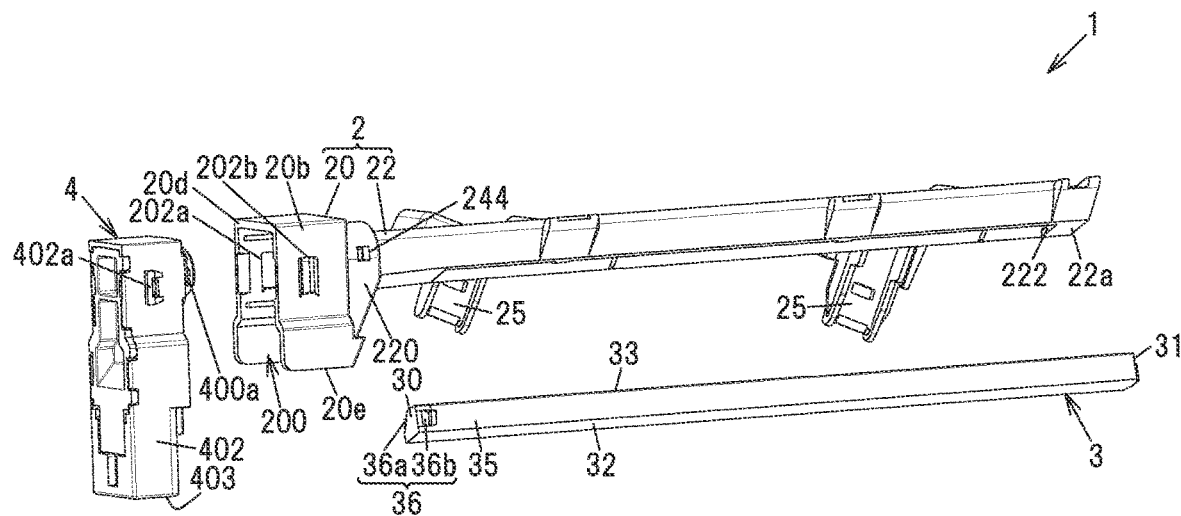
FIGS. 2B and 2C are exploded views showing the example of the lighting device.
Figure 2C:
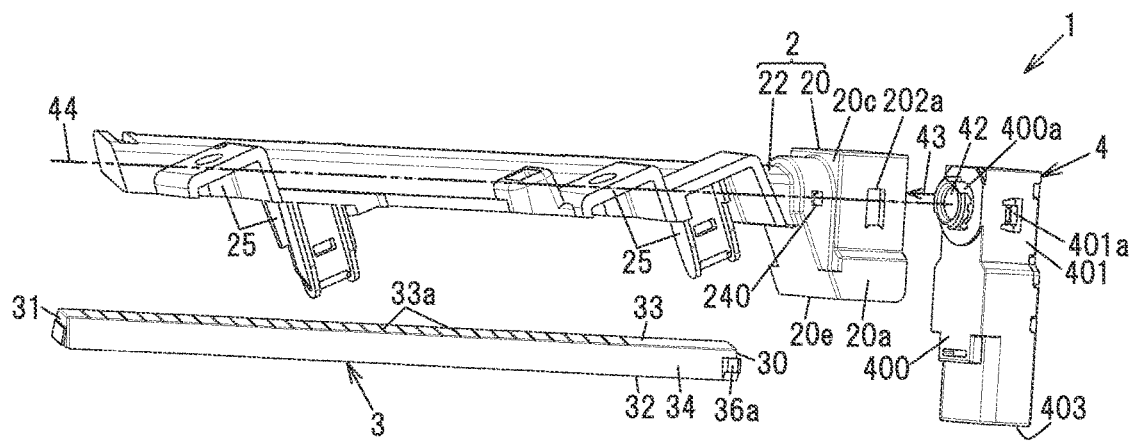
Figure 3A:
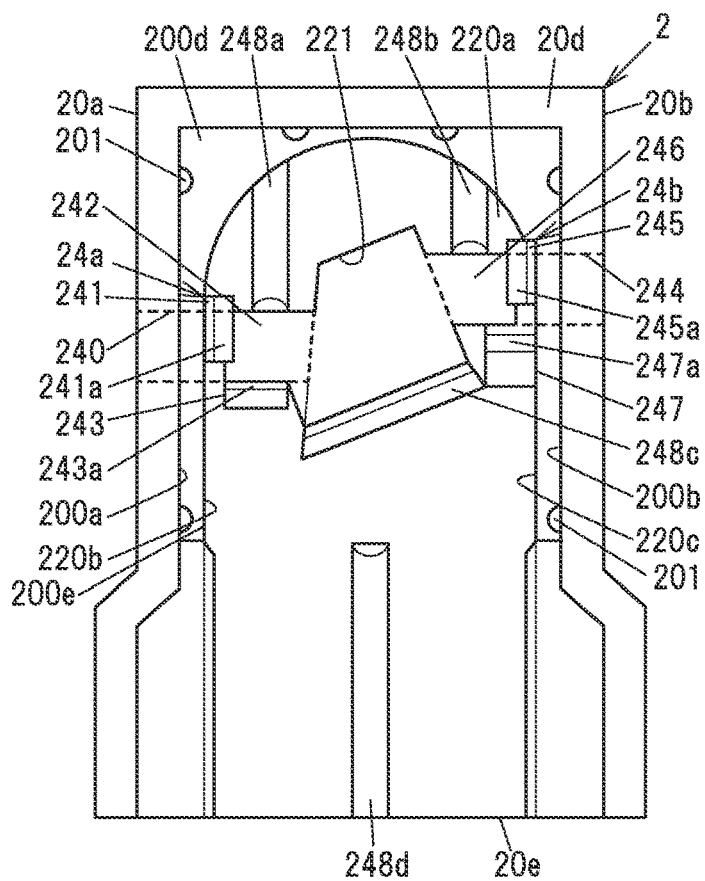
FIG. 3A is a diagram illustrating an example of when a housing of the lighting device in the first embodiment is viewed from an attachment portion side.
Figure 3B:
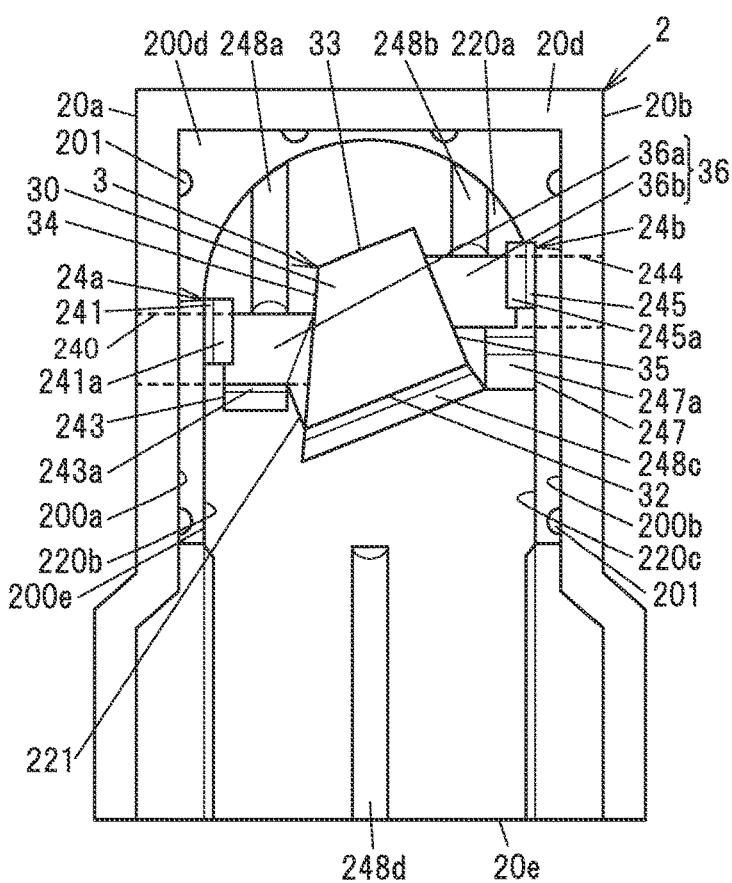
FIG. 3B is a diagram illustrating an example of a state in which a light guide is attached to the housing.
Figure 4A:
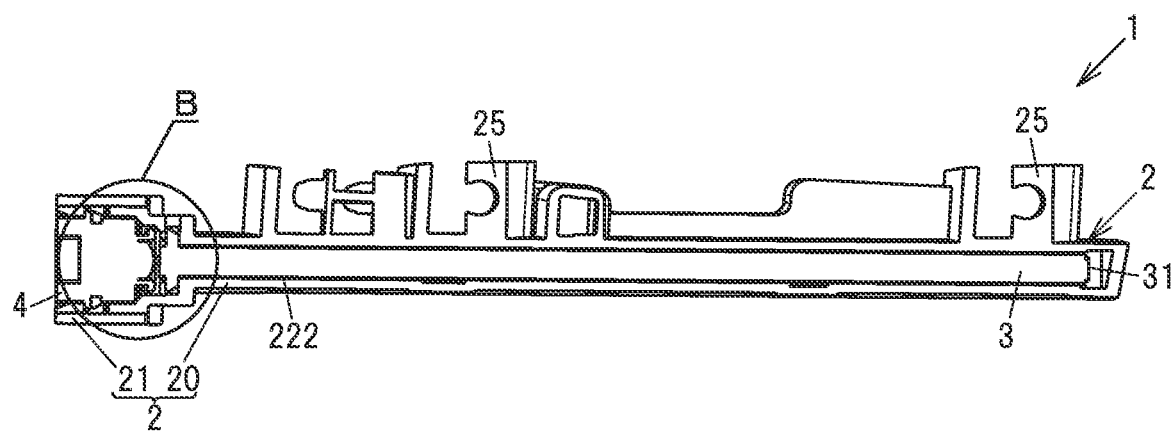
FIG. 4A is an example of a cross-sectional view showing the lighting device in the first embodiment when the cross section taken along line A-A in FIG. 2A is viewed in the arrow direction.
Figure 4B:
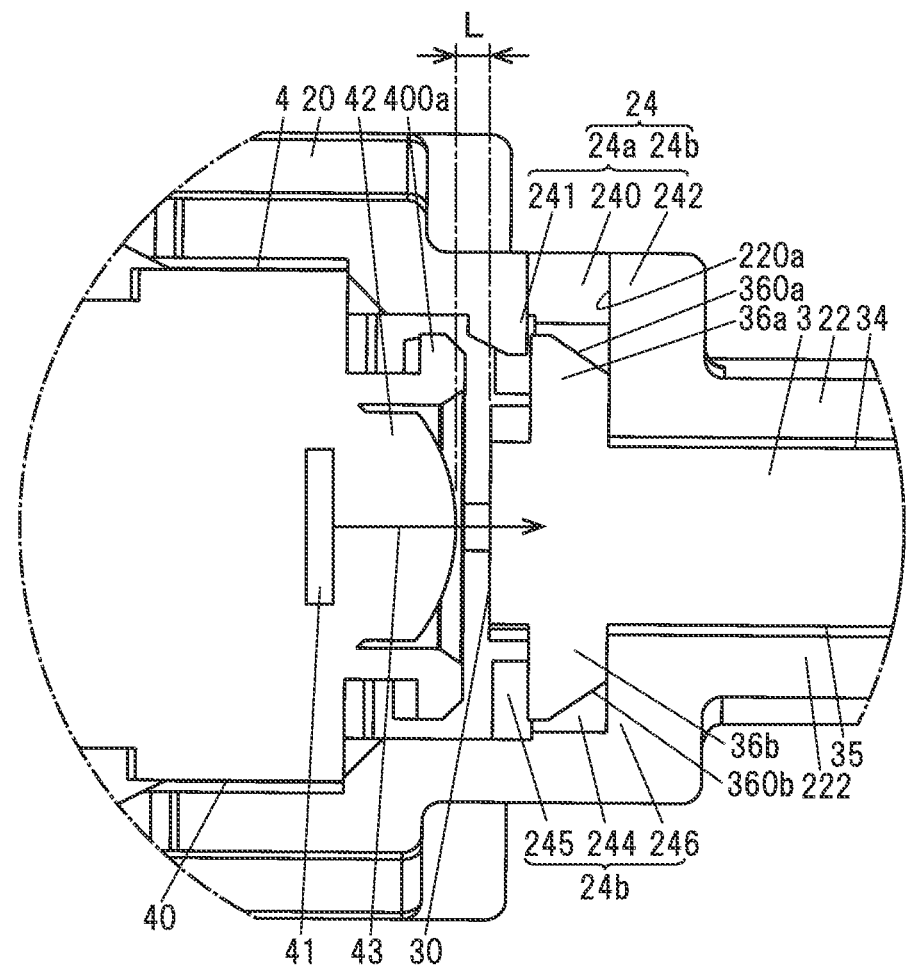
FIG. 4B is an example of an enlarged view showing a portion B of FIG. 4A.

FIG. 1A is an explanatory illustrating the interior of a vehicle to show an example of a position of a lighting device in the first embodiment, and FIG. 1B is a diagram illustrating an example of an illumination area illuminated by the lighting device. FIG. 2A is a side view showing an example of the lighting device in the first embodiment, and FIGS. 2B and 2C are exploded views showing the example of the lighting device. FIG. 3A is a diagram illustrating an example of when a housing of the lighting device in the first embodiment is viewed from an attachment portion side, and FIG. 3B is a diagram illustrating an example of a state in which a light guide is attached to the housing. FIG. 4A is an example of a cross-sectional view showing the lighting device in the first embodiment when the cross section taken along line A-A in FIG. 2A is viewed in the arrow direction, and FIG. 4B is an example of an enlarged view showing a portion B of FIG. 4A. In each drawing of the embodiments described below, a scale ratio or shape may be different from an actual ratio or shape.

The lighting device 1 in the first embodiment is lighting to decorate mainly the interior of a vehicle 9 as shown in FIG. 1A, but it is not limited thereto. The lighting device 1 may be used as lighting to decorate the exterior. The lighting device 1 is arranged around an instrument panel 90 or a floor console 94 as an example, but may be arranged on a ceiling, etc., and it is not limited thereto. In addition, illumination light 10 of the lighting device 1 may be used for direct lighting or may be use for indirect lighting.

The instrument panel 90 is a vehicle interior part which is arranged in front of a driver's seat 97 and a front passenger seat 98, as shown in FIG. 1A. The instrument panel 90 is composed of an upper panel 90a constituting an upper portion thereof, and a lower panel 90b constituting a bottom portion. An air conditioner vent 91 and a meter panel 92, etc., are provided on the upper panel 90a. A glove box 93, etc., is provided on the lower panel 90b. As an example, the lighting device 1 may be used as lighting to decorate the air conditioner vent 91, the meter panel 92 and the glove box 93, etc.

As shown in FIG. 1A, a tray 95 and a console box 96, etc., are arranged on the floor console 94. As an example, the lighting device 1 may be used as lighting to decorate the tray 95 or the console box 96, etc.

As shown in FIGS. 1B to 3B, the lighting device 1 generally includes a light source unit 4, an elongated light guide 3, and a housing 2. The light source unit 4 outputs light 43. The light guide 3 has a first end surface 30 on which the light 43 is incident, a second end surface 31 located opposite to the first end surface 30, an emitting surface 32 which is one of longitudinal side surfaces intersecting the first end surface 30 and the second end surface 31 and from which the light 43 is emitted, and at least one held portion 36 provided on at least one of the longitudinal side surfaces different from the emitting surface 32, and the light guide 3 guides the light 43 from the first end surface 30 to the second end surface 31. The housing 2 has an attachment portion 20 to which the light source unit 4 is attached, a housing portion 22 that is open at an end portion 220 on the attachment portion 20 side and has a housing recess 222 to house the light guide 3 and an exposure opening 223 exposing the emitting surface 32, and a holding portion 24 that holds the light guide 3 in the housing recess 222 by sandwiching the at least one held portion 36.

As shown in FIGS. 2B and 2C, the held portion 36 in the first embodiment is provided on the first end surface 30 side of the light guide 3. Meanwhile, as shown in FIGS. 4A and 4B, the holding portion 24 in the first embodiment is provided on the housing recess 222 on the attachment portion 20 side of the housing 2, and has holding recesses (described later) to which the held portion 36 is fitted, and claw portions (described later) which are walls of the holding recesses on the attachment portion 20 side, guide an insertion of the light guide 3 into the housing recess 222 and further suppress coming out of the light guide 3 from the housing recess 222.

Furthermore, as an example, the held portion 36 in the first embodiment has a first held portion 36a protruding from a left side surface 34 as a first side surface adjacent to the emitting surface 32, and a second held portion 36b protruding from a right side surface 35 as a second side surface located opposite to the left side surface 34, as shown in FIGS. 2B and 2C. In this regard, the held portion 36 is not limited thereto. The number may be one, or even more than two.

Meanwhile, as an example, the holding portion 24 in the first embodiment has a first holding portion 24a to hold the first held portion 36a and a second holding portion 24b to hold the second held portion 36b, as shown in FIGS. 4A and 4B. In this regard, the holding portion 24 is not limited thereto and is provided according to the number of the held portions 36.

(Configuration of the Housing 2)

The attachment portion 20 and the housing portion 22 of the housing 2 are integrally formed by injection molding using a resin material. The resin material may be any resin material that can be used for injection molding.

As shown in FIGS. 2B to 3B, an attachment opening 200 into which the light source unit 4 is inserted is formed on a back surface 20d of the attachment portion 20. The attachment portion 20 is open at a lower surface 20e so that a portion of the light source unit 4 protrudes from the lower surface 20e when the light source unit 4 is attached to the attachment opening 200.

As shown in FIGS. 3A and 3B, two guide ribs 201 are provided on each of an inner surface 200a, an inner surface 200b and an upper inner surface 200c of the attachment opening 200. The guide ribs 201 guide the insertion of the light source unit 4 and also suppresses movement of the light source unit 4 in a left-right direction of the paper of FIGS. 3A and 3B.

The attachment portion 20 also has a through-hole 202a penetrating from the inner surface 200a to a side surface 20a, and a through-hole 202b penetrating from the inner surface 200b to a side surface 20b. As shown in FIGS. 2A to 2C, the through-hole 202a has a shape to which a light source unit-side claw portion 401a of the light source unit 4 fits. Likewise, the through-hole 202b has a shape to which a light source unit-side claw portion 402a fits. In this regard, the through-holes 202a and 202b may not be holes penetrating to the side surfaces 20a and 20b.

As shown in FIGS. 3A and 3B, the attachment portion 20 further has an opening 200e on a bottom surface 200d of the attachment opening 200. An upper portion of the opening 200e has a semicircular shape which corresponds to the shape of a cylindrical portion 400a of the light source unit 4. An insertion opening 221 into which the light guide 3 is inserted is provided on an end surface 220a as a bottom surface of the opening 200e.

The housing portion 22 has an elongated shape. The housing recess 222 is provided on a lower surface 22a of the housing portion 22. As shown in FIG. 1B, the shape of the housing recess 222 in a lateral direction (which is herein defined as a direction perpendicular to the longitudinal direction of the housing portion 22) corresponds to the shapes of the left side surface 34, the right side surface 35 and an opposite surface 33 of the light guide 3. Left and right here are as viewed from the first end surface 30 which is an incident surface on which the light 43 is incident, and a side surface on the left of the first end surface 30 is the left side surface 34 and a side surface on the right is the right side surface 35.

As shown in FIG. 2B, the housing recess 222 has the exposure opening 223 on the lower surface 22a side. The illumination light 10 is emitted from the exposure opening 223 and illuminates an illumination target 6.

As shown in FIGS. 3A and 3B, the end portion 220 of the housing portion 22 has the insertion opening 221 in communication with the attachment opening 200. The insertion opening 221 is an opening for insertion of the light guide 3 and is provided on the end surface 220a on the attachment portion 20 side of the housing portion 22. The insertion opening 221 has a shape corresponding to the shape of the light guide 3 in a lateral direction (which is herein defined as a direction perpendicular to the longitudinal direction of the light guide 3).

As shown in FIGS. 2A to 2C, the housing portion 22 has plural attachment pieces 25, as an example. As shown in FIG. 1B, the attachment pieces 25 are used for attaching to an attachment target member 7 through bolts, etc., as an example.

The holding portion 24 has the first holding portion 24a and the second holding portion 24b, as described above. As shown in FIG. 4B, the first holding portion 24a has a holding recess 240, a claw portion 241, and a wall portion 242. Likewise, the second holding portion 24b has a holding recess 244, a claw portion 245, and a wall portion 246.

As shown in FIG. 4B, the first held portion 36a of the light guide 3 is fitted to the holding recess 240 of the first holding portion 24a. The holding recess 240 is a space formed between the claw portion 241 and the wall portion 242 and is a hole penetrating through the end portion 220. The claw portion 241 has an inclined surface 241a on the light source unit 4 side. The inclined surface 241a comes into contact with the first held portion 36a at the time of inserting the light guide 3. Since the claw portion 241 is elastically deformed by this contact at the time of insertion, the first held portion 36a passes over the claw portion 241 and fits to the holding recess 240.

As shown in FIG. 4B, the second held portion 36b of the light guide 3 is fitted to the holding recess 244 of the second holding portion 24b. The holding recess 244 is a space formed between the claw portion 245 and the wall portion 246 and is a hole penetrating through the end portion 220. The claw portion 245 has an inclined surface 245a on the light source unit 4 side. The inclined surface 245a comes into contact with the second held portion 36b at the time of inserting the light guide 3. Since the claw portion 245 is elastically deformed by this contact at the time of insertion, the second held portion 36b passes over the claw portion 245 and fits to the holding recess 244.

As shown in FIGS. 3A and 3B, the claw portion 241 of the first holding portion 24a is provided lower than the claw portion 245 of the second holding portion 24b to match the positions of the first held portion 36a and the second held portion 36b of the light guide 3.

The first holding portion 24a further has a lower claw portion 243. That is, the first holding portion 24a holds the first held portion 36a in the holding recess 240 with the claw portion 241 and the lower claw portion 243. The lower claw portion 243 has an inclined surface 243a that the light guide 3 comes into contact with at the time of insertion. As a modification, the first holding portion 24a may be configured to include either one of the claw portion 241 and the lower claw portion 243, or may be configured to include more claw portions.

The second holding portion 24b further has a lower claw portion 247. That is, the second holding portion 24b holds the second held portion 36b in the holding recess 244 with the claw portion 245 and the lower claw portion 247. The lower claw portion 247 has an inclined surface 247a that the light guide 3 comes into contact with at the time of insertion. As a modification, the second holding portion 24b may be configured to include either one of the claw portion 245 and the lower claw portion 247, or may be configured to include more claw portions.

As shown in FIGS. 3A and 3B, the claw portion 241 of the first holding portion 24a is provided so as to protrude from an inner surface 220b which extends in a direction intersecting the end surface 220a. The lower claw portion 243 is provided on the end surface 220a.

The claw portion 245 of the second holding portion 24b is provided so as to protrude from an inner surface 220c which extends in a direction intersecting the end surface 220a. The inner surface 220c faces the inner surface 220b. The lower claw portion 247 is provided on the end surface 220a.

Guide ribs 248a and 248b, an inclined portion 248c, and a rib 248d are provided on the end surface 220a. The guide rib 248a is provided on the upper side of the insertion opening 221 to guide the upper portion of the first held portion 36a. The guide rib 248b is provided on the upper side of the insertion opening 221 to guide the upper portion of the second held portion 36b. The inclined portion 248c is inclined in the insertion direction of the light guide 3 with respect to the end surface 220a, and is provided on the lower side of the insertion opening 221 to guide the insertion on the emitting surface 32 side of the light guide 3.

The rib 248d is an elongated rib provided on the end surface 220a. The guide ribs 248a, 248b and the rib 248d determine a distance between the light source unit 4 and the end surface 220a.

(Configuration of the Light Guide 3)

The light guide 3 is formed using a transparent resin material. The light guide 3 has a polygonal-pillar shape whose bottom surfaces are the congruent and parallel first and second end surfaces 30 and 31 as an example, but it is not limited thereto. Alternatively, the first end surface 30 on which the light 43 is incident may be inclined in a direction toward the emitting surface 32 to bend the light 43 toward the emitting surface 32.

In a cross section in the lateral direction, the light guide 3 has a shape in which a side with the emitting surface 32 is longer than a side with the opposite surface 33 opposite to the emitting surface 32. In particular, the light guide 3 when viewed from the first end surface 30 has a trapezoidal shape in which the short base-side surface is the opposite surface 33, the long base-side surface is the emitting surface 32, and the leg-side surfaces are the left side surface 34 and the right side surface 35, as shown in FIG. 3B.

As shown in FIG. 1B, the light 43 emitted as illumination light 10 from the emitting surface 32 illuminates the illumination target 6. In FIG. 1B, an illumination range 100 in the lateral direction of the lighting device 1 is indicated by dash-dot lines. As shown in FIG. 1B, the light guide 3 has a trapezoidal shape in the lateral direction to increase a distance R of the illumination range 100 in the lateral direction on the illumination target 6, as an example.

As shown in FIG. 2C, plural grooves 33a are provided on the opposite surface 33 of the light guide 3. The grooves 33a are provided along the lateral direction of the light guide 3, i.e., along a direction intersecting the left side surface 34 and the right side surface 35. As an example, the grooves 33a have a V-shape or U-shape and are formed at equal intervals, and the grooves 33a located farther from the first end surface 30 have a larger depth. The grooves 33a are provided so that the light 43 propagating inside the light guide 3 is reflected and scattered in a direction toward the emitting surface 32.

The first held portion 36a is provided so as to protrude from the left side surface 34. The second held portion 36b is provided so as to protrude from the right side surface 35. The first held portion 36a and the second held portion 36b protrude horizontally in the drawing of FIG. 3B. The first held portion 36a and the second held portion 36b have a polygonal-pillar shape as an example, but are not limited thereto.

(Configuration of the Light Source Unit 4)

The light source unit 4 includes a housing 40, a light-emitting element 41, and a lens 42. As an example, the housing 40 is formed in a box shape using a resin material. As shown in FIG. 2C, the cylindrical portion 400a is provided on a front surface 400 of the housing 40. The lens 42 is arranged in the cylindrical portion 400a.

The light source unit-side claw portion 401a is provided on a first side surface 401 of the housing 40. The light source unit-side claw portion 402a is provided on a second side surface 402. When attaching the light source unit 4 to the attachment opening 200 of the housing 2, the light source unit-side claw portion 401a is fitted to the through-hole 202a and the light source unit-side claw portion 402a to the through-hole 202b, and the light source unit 4 is thereby attached to the housing 2. That is, the light source unit 4 is positioned with respect to the housing 2 by fitting the light source unit-side claw portion 401a to the through-hole 202a and the light source unit-side claw portion 402a to the through-hole 202b.

In the lighting device 1, the light source unit 4 is attached to the housing 2 in which the light guide 3 is held, as shown in FIG. 4B. Therefore, a distance L from the light source unit 4 to the first end surface 30 of the light guide 3 is fixed with higher precision as compared to when the light guide is held by the housing and the light source unit.

A connector portion 5 is connected to a lower surface 403 of the housing 40. Power is supplied to the light source unit 4 through the connector portion 5.

The light-emitting element 41 is an LED (Light Emitting Diode) element, as an example. As shown in FIG. 4B, the light-emitting element 41 outputs the light 43 toward the light guide 3 through the lens 42. An optical axis 44 of this light 43 passes through the center of the light guide 3.

(Assembly of the Lighting Device 1)

Figure 5A:
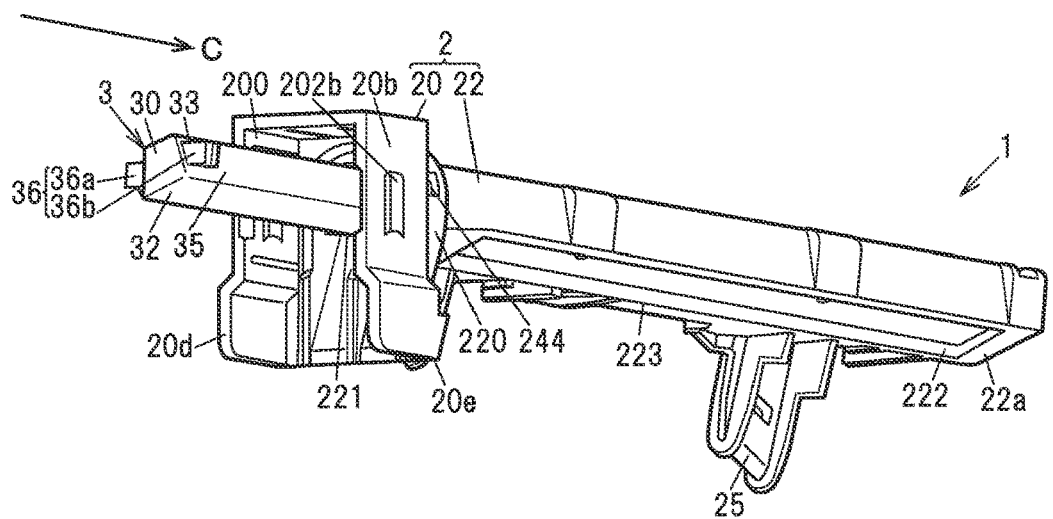
FIGS. 5A and 5B are examples of explanatory diagrams illustrating how the light guide is inserted into the housing of the lighting device in the first embodiment.
Figure 5B:
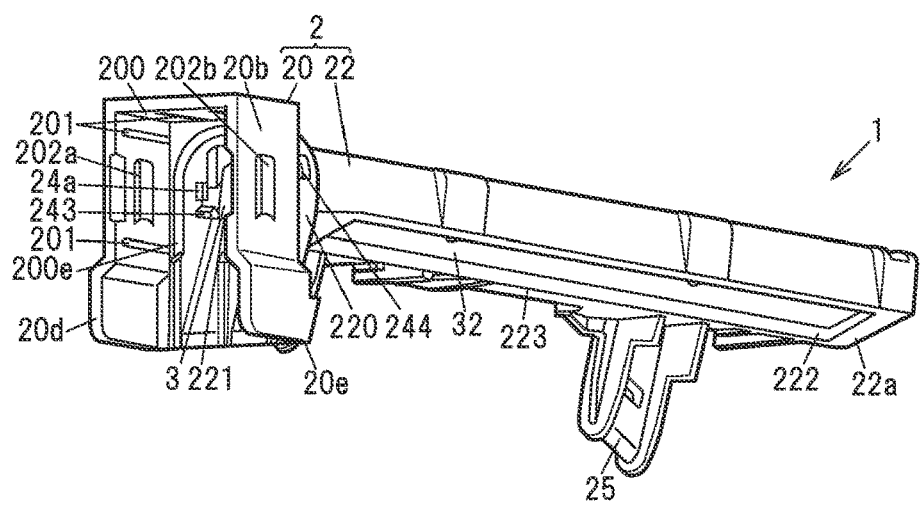
Figure 5C:
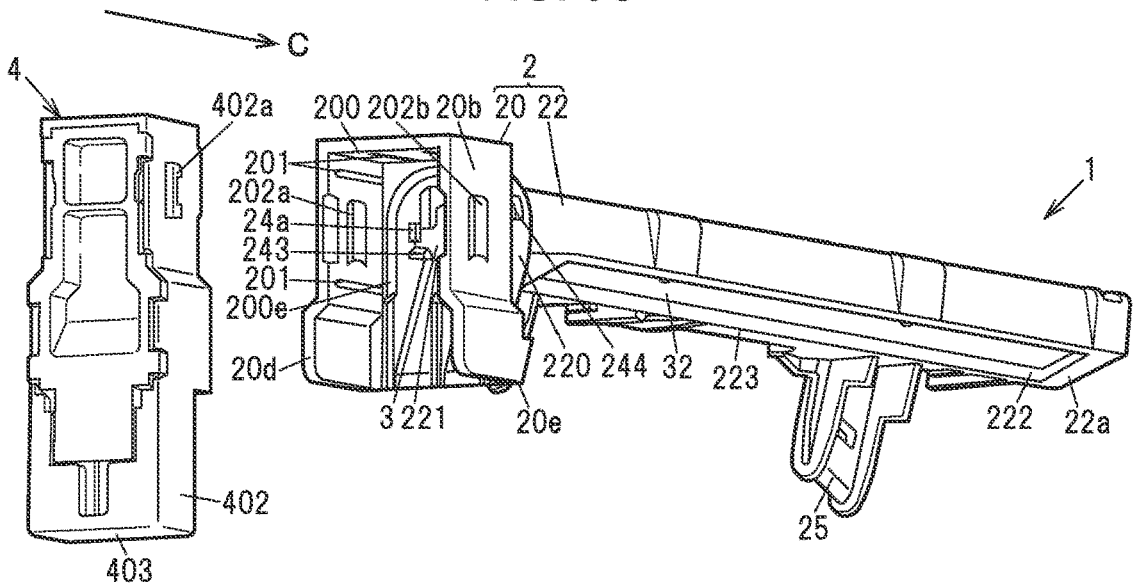
FIG. 5C is an example of an explanatory diagram illustrating how a light source unit is attached to the housing.

FIGS. 5A and 5B are examples of explanatory diagrams illustrating how the light guide is inserted into the housing of the lighting device in the first embodiment, and FIG. 5C is an example of an explanatory diagram illustrating how the light source unit is attached to the housing.

As shown in FIG. 5A, the light guide 3 is inserted into the housing 2 in a direction of arrow C, is guided by the inclined portion 248c, and enters the insertion opening 221 from the second end surface 31. Since the light guide 3 has a trapezoidal shape, it is easy to perform insertion with the emitting surface 32 on the exposure opening 223 side.

Next, as shown in FIG. 5B, by further inserting the light guide 3, the first held portion 36a is fitted to and held by the first holding portion 24a and the second held portion 36b is fitted to and held by the second holding portion 24b. By this insertion, the light guide 3 is integrated with the housing 2 and is also positioned with respect to the housing 2.

Next, as shown in FIG. 5C, the light source unit 4 is inserted into the attachment portion 20 of the housing 2 in the direction of arrow C in the same direction as for the light guide 3, and is attached to the housing 2, and the assembly of the lighting device 1 is thereby completed.

The light source unit 4 is integrated with the housing 2 by this insertion and is also positioned with respect to the housing 2 by the plural guide ribs 201, the guide ribs 248a, 248b and the rib 248d. As a result, the light source unit 4 is also positioned with respect to the light guide 3.

(Effects of the First Embodiment)

The lighting device 1 in the first embodiment allows for improvement in assembly workability. In particular, the light guide 3 is held by the housing 2 in the lighting device 1. Therefore, as compared to when not held by the housing 2, the light guide 3 does not easily come off from the housing 2, which makes it easier to work and improves assembly workability.

For lighting devices in which the light guide is held by the housing and the light source unit, a member to suppress movement of the light guide in the longitudinal direction needs to be provided on the light source unit, resulting in a low degree of freedom in design. However, in the lighting device 1, the light guide 3 is held by the housing 2, which provides more degrees of freedom in designing the light source unit 4.

In the lighting device 1, the held portion 36 held by the holding portion 24 is provided on the side surfaces of the light guide 3 other than the emitting surface 32. Therefore, as compared to when attaching to the housing by holding the emitting surface, emission of the illumination light 10 from the emitting surface 32 is not blocked, allowing for efficient illumination.

In the lighting device 1, the light guide 3 is held by the housing 2 at a position close to the first end surface 30 which is the incident surface. Therefore, as compared to when held at a position far from the first end surface 30, accuracy of the distance L from the light source unit 4 to the first end surface 30 is improved.

The light guide 3 of the lighting device 1 has a trapezoidal shape. Therefore, as compared to when this configuration is not adopted, it is easier to perform the insertion with the emitting surface 32 on the exposure opening 223 side and assembling workability can thereby be improved.

The lighting device 1 is configured such that the attachment direction of the light guide 3 to the housing 2 and that of the light source unit 4 to the housing 2 are the same. Therefore, as compared to when different, assembling workability can be improved.

Second Embodiment

The second embodiment differs from the first embodiment in that the held portion and the holding portion are located on the housing recess side of the housing portion.

Figure 6A:
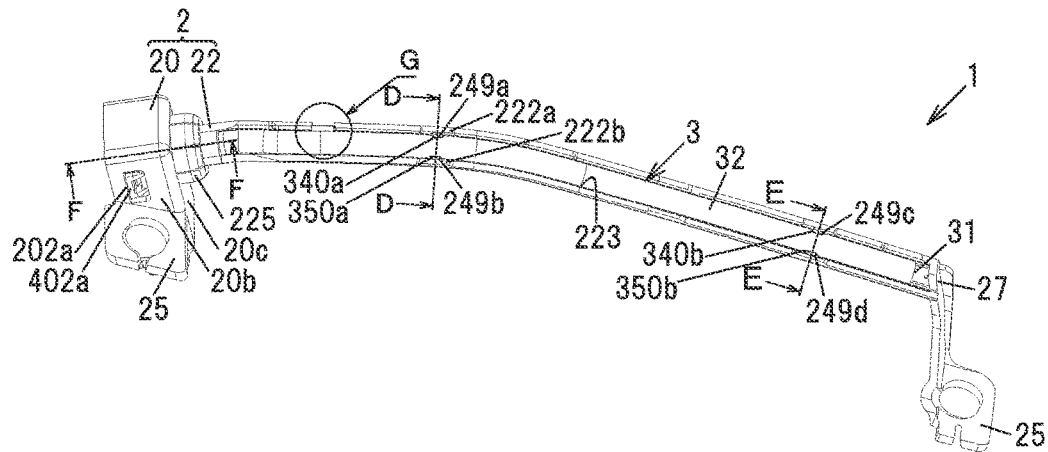
FIG. 6A is a side view showing an example of the lighting device in the second embodiment.
Figure 6B:
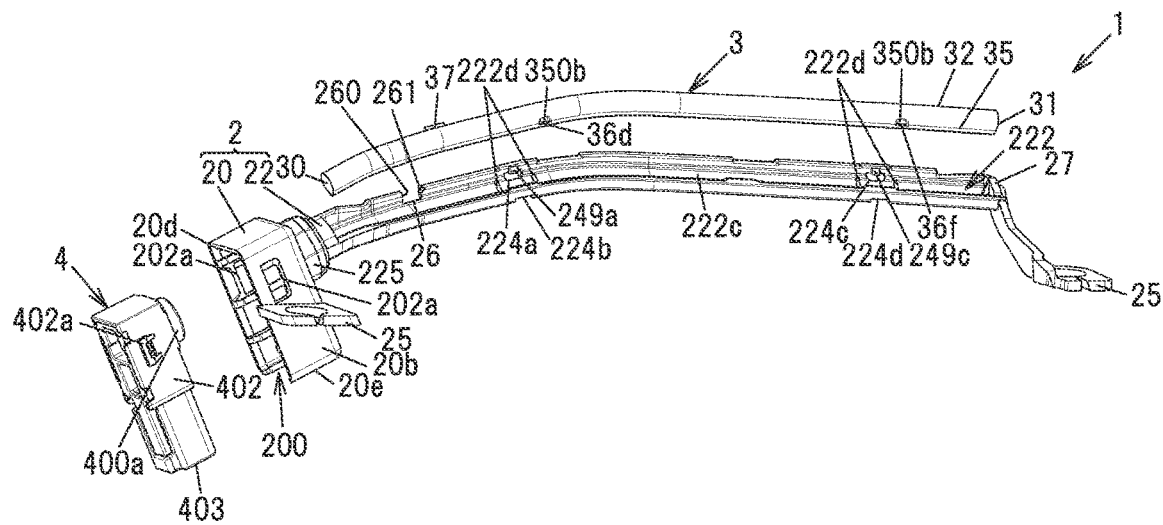
FIGS. 6B and 6C are exploded views showing the example of the lighting device.
Figure 6C:
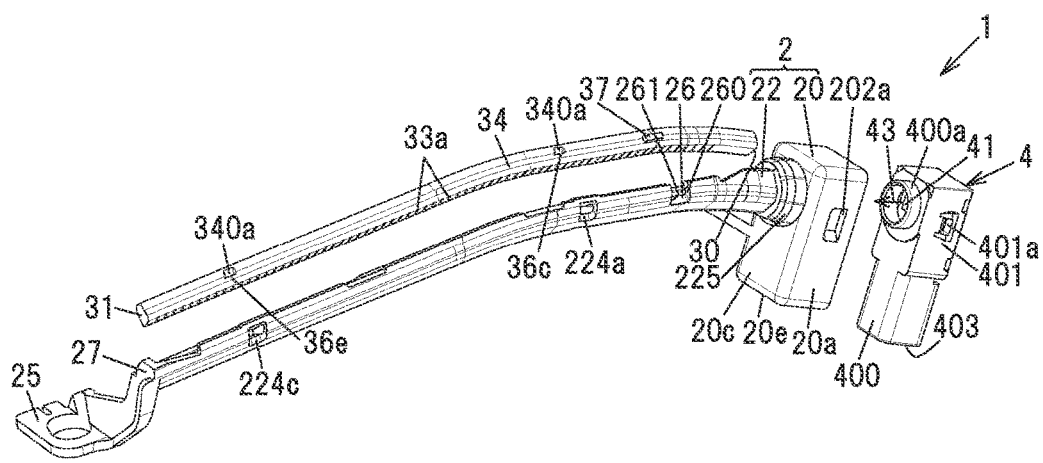
Figure 7A:
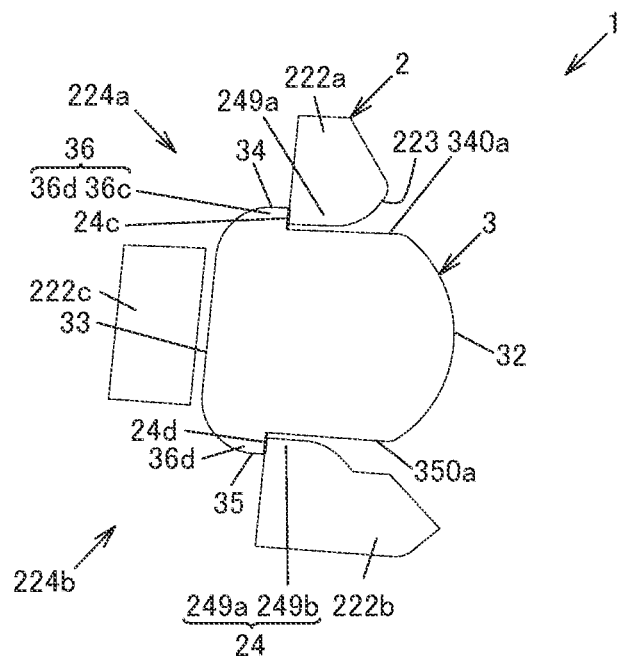
FIG. 7A is an example of a cross-sectional view showing the lighting device in the second embodiment when the cross section taken along line D-D in FIG. 6A is viewed in the arrow direction.
Figure 7B:
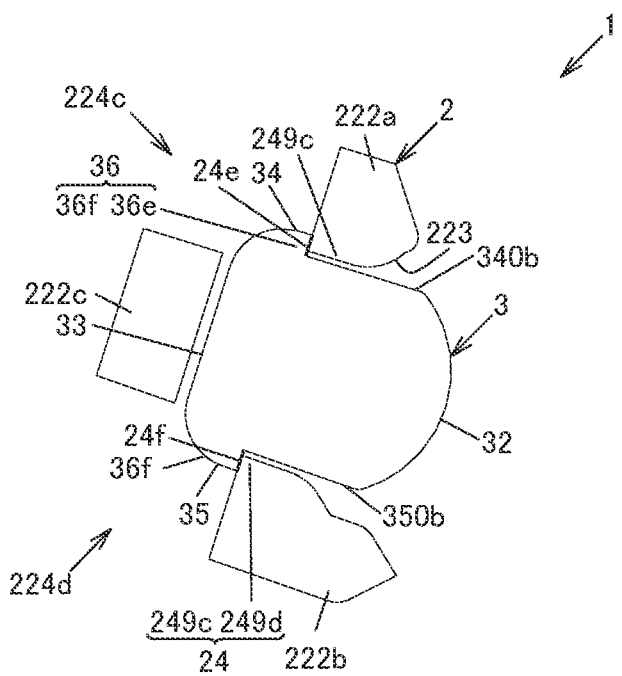
FIG. 7B is an example of a cross-sectional view when the cross section taken along line E-E in FIG. 6A is viewed in the arrow direction.
Figure 8A:
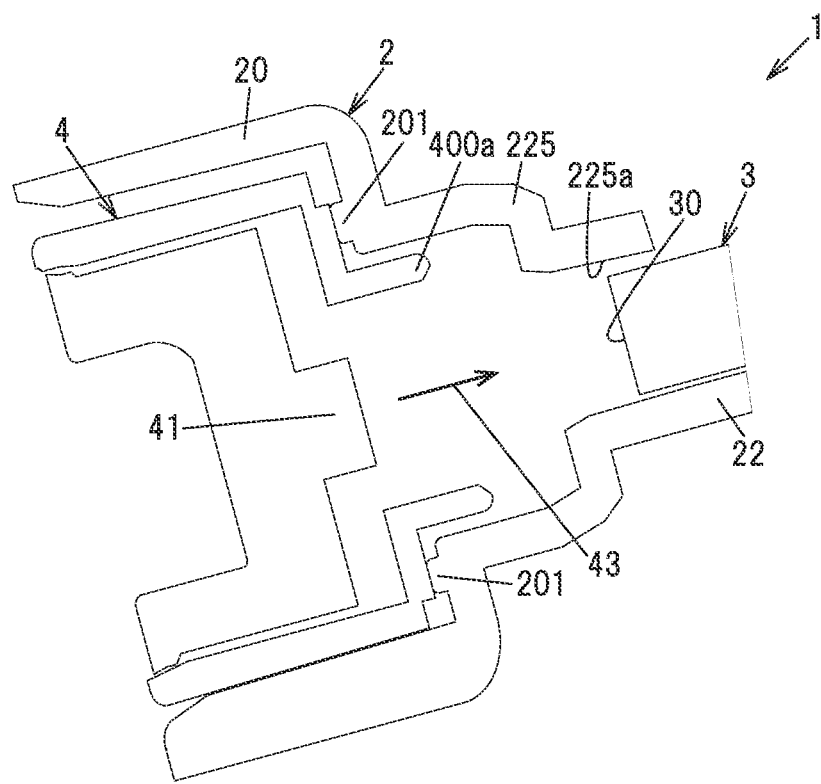
FIG. 8A is an example of a cross-sectional view showing the lighting device in the second embodiment when the cross section taken along line F-F in FIG. 6A is viewed in the arrow direction.
Figure 8B:
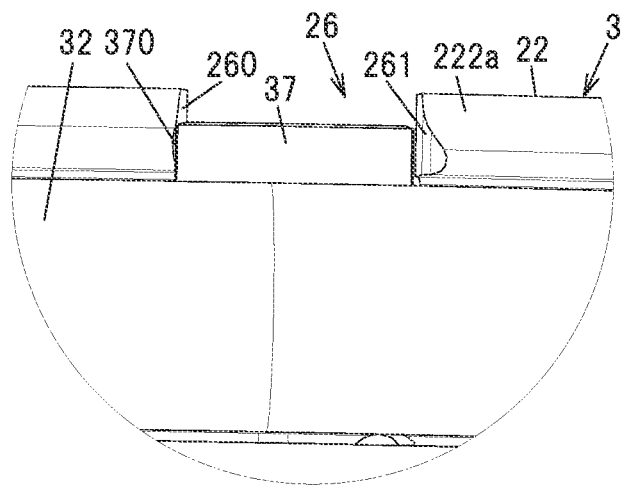
FIG. 8B is an example of an enlarged view showing a portion G of FIG. 6A.
Figure 9A:
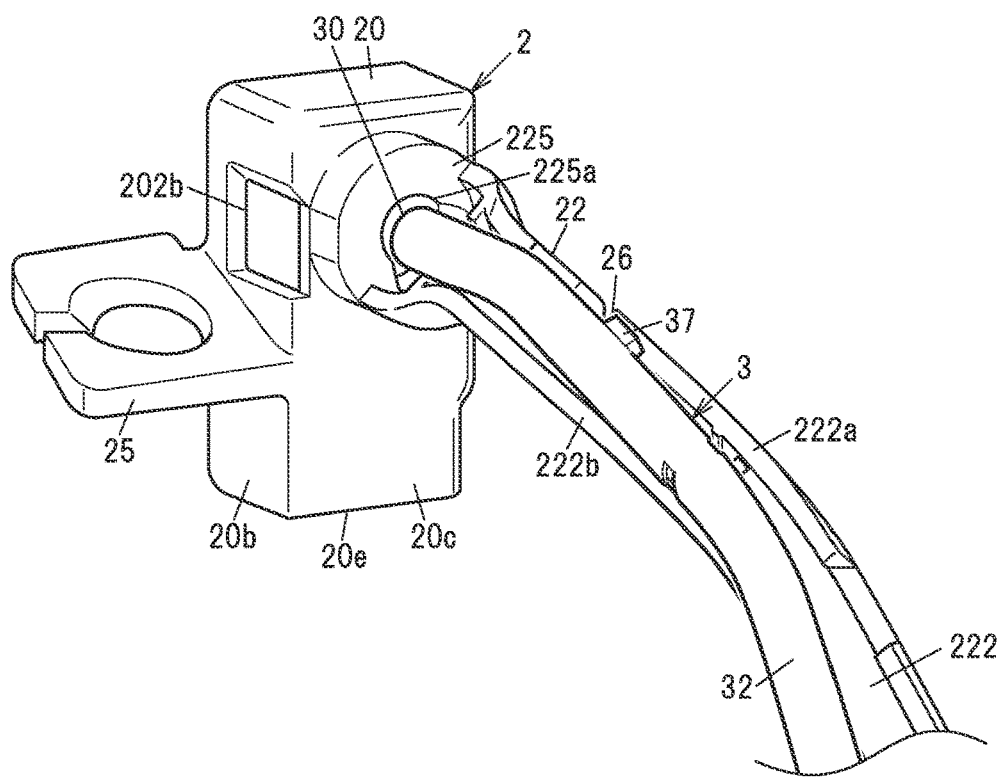
FIGS. 9A and 9B are explanatory diagrams illustrating an example of how the light guide of the lighting device in the second embodiment is assembled.
Figure 9B:
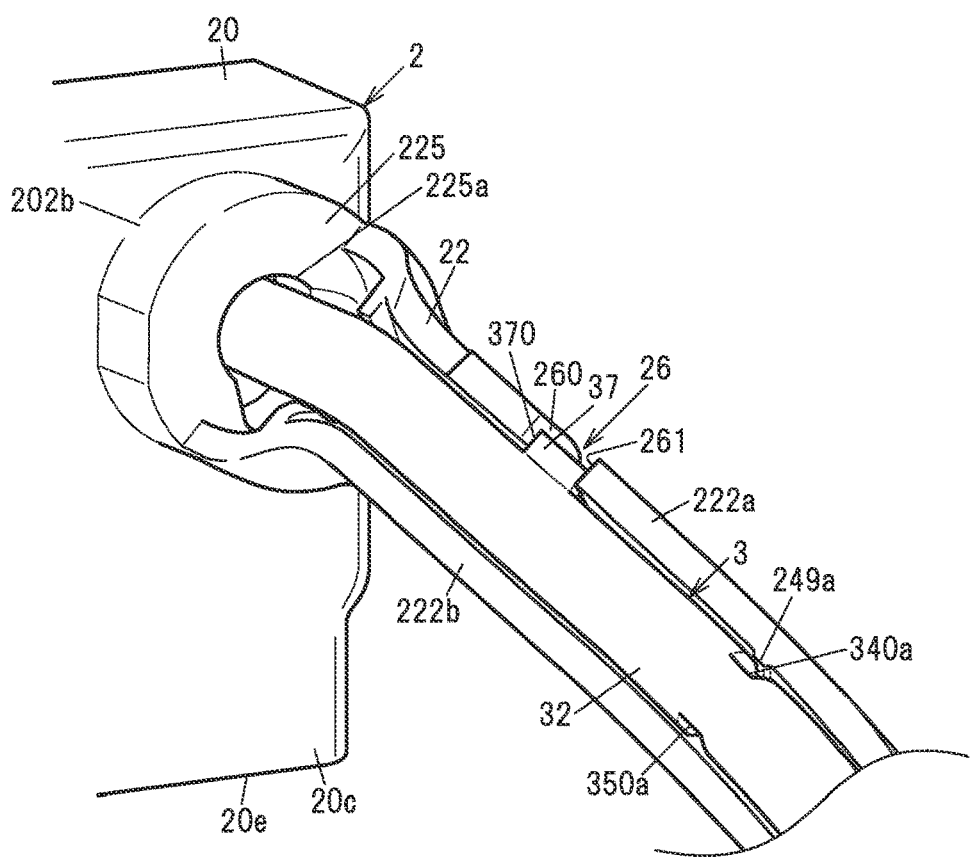
Figure 10A:
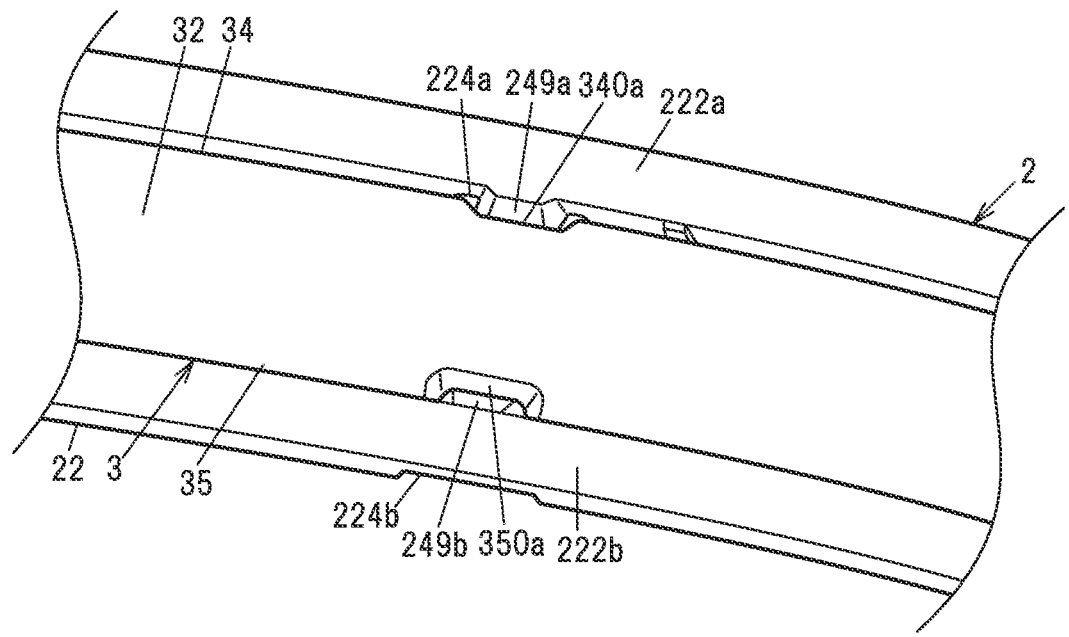
FIGS. 10A and 10B are explanatory diagrams illustrating an example of how a held portion and a holding portion are fitted to each other in the lighting device in the second embodiment.
Figure 10B:
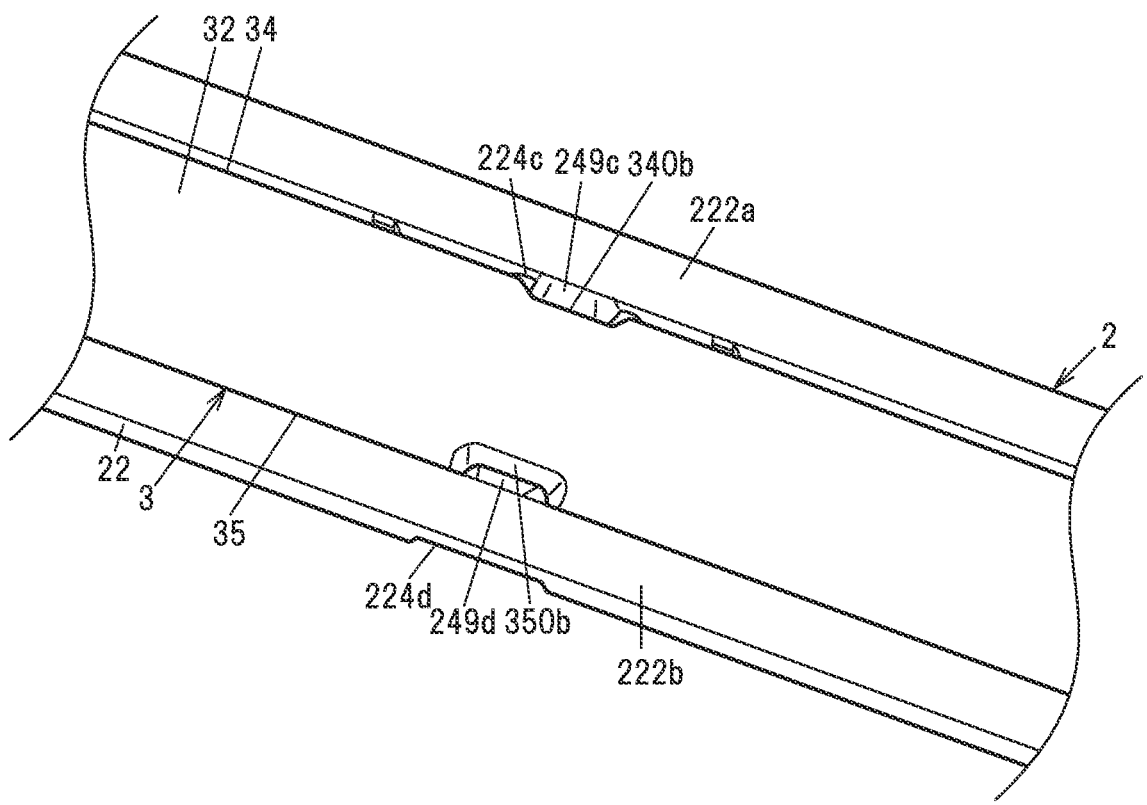
Figure 11:
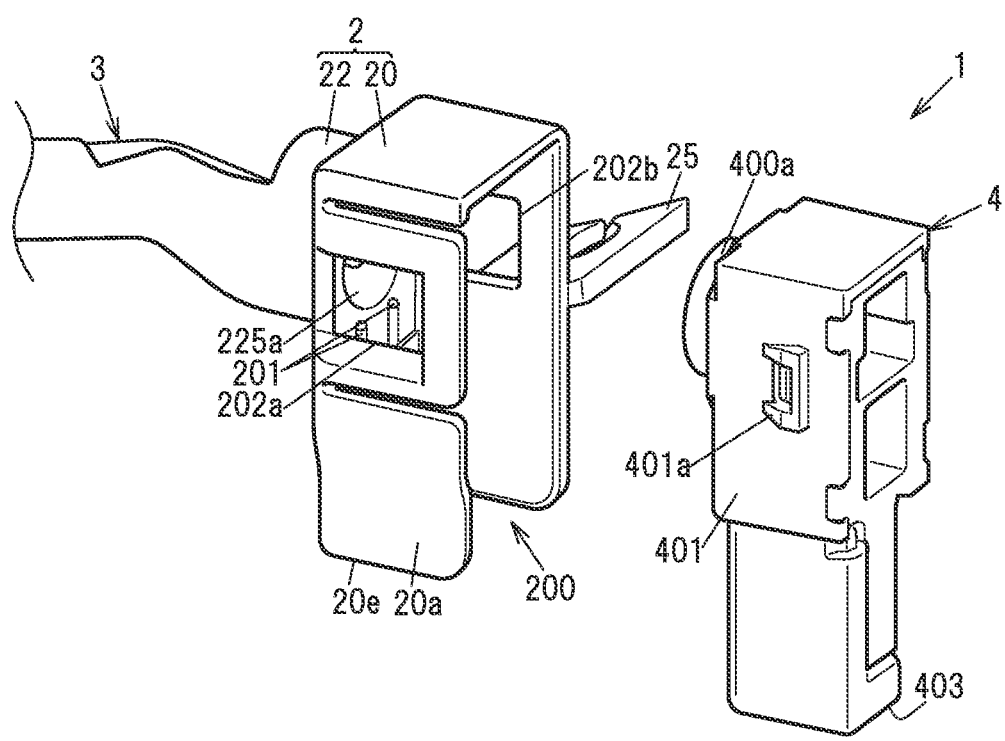
FIG. 11 is an explanatory diagram illustrating an example of how the light source unit is attached at the time of assembling the lighting device in the second embodiment.

FIG. 6A is a side view showing an example of the lighting device in the second embodiment, and FIGS. 6B and 6C are exploded views showing the example of the lighting device. FIG. 7A is an example of a cross-sectional view showing the lighting device in the second embodiment when the cross section taken along line D-D in FIG. 6A is viewed in the arrow direction, and FIG. 7B is an example of a cross-sectional view when the cross section taken along line E-E in FIG. 6A is viewed in the arrow direction. FIG. 8A is an example of a cross-sectional view showing the lighting device in the second embodiment when the cross section taken along line F-F in FIG. 6A is viewed in the arrow direction, and FIG. 8B is an example of an enlarged view showing a portion G of FIG. 6A. FIGS. 9A and 9B are explanatory diagrams illustrating an example of how the light guide of the lighting device in the second embodiment is assembled. FIGS. 10A and 10B are explanatory diagrams illustrating an example of how the held portion and the holding portion are fitted to each other in the lighting device in the second embodiment. FIG. 11 is an explanatory diagram illustrating an example of how the light source unit is attached at the time of assembling the lighting device in the second embodiment. In the embodiment described below, portions having the same functions and configurations as those in the first embodiment are denoted by the same reference signs as those in the first embodiment and the explanation thereof will be omitted.

(General Configuration of the Lighting Device 1)

The held portion 36 is composed of bottom portions of recessed portions that are indentations provided on at least one of the left side surface 34 as the first side surface and the right side surface 35 as the second side surface which are adjacent to the emitting surface 32.

Meanwhile, the holding portion 24 is composed of raised portions provided so as to correspond to the held portion 36 and protruding toward inside of the housing recess 222 from at least one of first and second wall portions 222a and 222b forming the housing recess 222, and holds the light guide 3 in the housing recess 222 by sandwiching the held portion 36 as the bottom portions of the recessed portions between a bottom surface portion 222c of the housing recess 222 and lower surfaces of the raised portions.

As an example, the held portion 36 in the second embodiment has a first held portion 36c that is a bottom portion of a first recessed portion 340a being an indentation provided on the left side surface 34, and a second held portion 36d that is located opposite to the first held portion 36c and is a bottom portion of a second recessed portion 350a being an indentation provided on the right side surface 35, as shown in FIGS. 6A to 7A.

As an example, the held portion 36 in the second embodiment also has a third held portion 36e that is a bottom portion of a third recessed portion 340b being an indentation provided on the left side surface 34, and a fourth held portion 36f that is a bottom portion of a fourth recessed portion 350b being an indentation provided on the right side surface 35, as shown in FIGS. 6A to 7B.

That is, the held portion 36 has the first held portion 36c to the fourth held portion 36f In this regard, the number of the held portions 36 is not limited thereto.

Meanwhile, as an example, the holding portion 24 in the second embodiment has a first holding portion 249a provided so as to correspond to the first held portion 36c and a second holding portion 249b located opposite to the first holding portion 249a and provided so as to correspond to the second held portion 36d, as shown in FIGS. 6A to 7A.

As an example, the holding portion 24 in the second embodiment further has a third holding portion 249c provided so as to correspond to the third held portion 36e and a fourth holding portion 249d located opposite to the third holding portion 249c and provided so as to correspond to the fourth held portion 36f, as shown in FIGS. 6A to 7B.

That is, the holding portion 24 has the first holding portion 249a and the third holding portion 249c on the left side surface 34, and the second holding portion 249b and the fourth holding portion 249d on the right side surface 35. A lower surface 24c of the first holding portion 249a, a lower surface 24d of the second holding portion 249b, a lower surface 24e of the third holding portion 249c, and a lower surface 24f of the fourth holding portion 249d are the lower surfaces of the raised portions. In this regard, it is not limited thereto. The holding portions 24 are provided on at least one of the left side surface 34 and the right side surface 35 according to the number of the held portions.

The housing recess 222 has a through-hole that is a hole formed at least either between the first wall portion 222a and the bottom surface portion 222c or between the second wall portion 222b and the bottom surface portion 222c, so as to correspond to the position of the held portion 36.

As an example, the housing recess 222 in the second embodiment has a first through-hole 224a and a third through-hole 224c which are provided between the first wall portion 222a and the bottom surface portion 222c so as to correspond to the first held portion 36c and the third held portion 36e, and a second through-hole 224b and a fourth through-hole 224d which are provided between the second wall portion 222b and the bottom surface portion 222c so as to correspond to the second held portion 36d and the fourth held portion 36f, as shown in FIGS. 7A and 7B.

The first through-hole 224a to the fourth through-hole 224d are provided to allow a tool, etc., to be inserted when removing the light guide 3 from the housing recess 222, as an example. As a modification, the first held portion 36c to the fourth held portion 36f may be configured to protrude into the first through-hole 224a to the fourth through-hole 224d.

The housing recess 222 also has at least one notched recess 26 having a shape formed by partially cutting out at least one of the first and second wall portions 222a and 222b. The light guide 3 has at least one protruding portion 37 provided so as to correspond to the notched recess 26. As shown in FIG. 8B, the protruding portion 37 is inserted into the notched recess 26, comes into contact with a notch surface 260 of the notched recess 26 on the attachment portion 20 side, and is thereby positioned with respect to the housing portion 22 in the longitudinal direction.

As an example, one notched recess 26 and one protruding portion 37 are provided in the second embodiment as shown in FIGS. 6A to 6C. However, the configuration is not limited thereto.

(Configuration of the Housing 2)

Since the light guide 3 is gently curved, the housing portion 22 of the housing 2 has a shape corresponding to the curve of the light guide 3, as shown in FIGS. 6A to 6C.

On the attachment portion 20 side, the housing portion 22 also has a cylindrical protruding portion 225 that has a cylindrical shape and protrudes from a front surface 20c. As shown in FIGS. 9A and 9B, the cylindrical protruding portion 225 has an insertion hole 225a into which the first end surface 30 side of the light guide 3 is inserted. As shown in FIG. 8A, the insertion hole 225a is narrow on the housing recess 222 side and wide on the light source unit 4 side. The light guide 3 is inserted into the insertion hole 225a and the first end surface 30 thereby faces the light-emitting element 41 of the light source unit 4.

As an example, the housing recess 222 has plural ribs 222d that are provided on the bottom surface portion 222c and are in contact with the opposite surface 33 located opposite to the emitting surface 32, as shown in FIG. 6B. In the second embodiment, two ribs 222d are provided so as to sandwich the first through-hole 224a and the second through-hole 224b, and other two ribs 222d are provided so as to sandwich the third through-hole 224c and the fourth through-hole 224d. Alternatively, the ribs 222d may be provided on the opposite surface 33 of the light guide 3. Alternatively, the lighting device 1 may have a configuration in which the ribs 222d are not provided and the light guide 3 is in contact with the bottom surface portion 222c.

(Configuration of the Light Guide 3)

As an example, the light guide 3 is a polygonal-pillar shape and is gently curved in the middle as shown in FIGS. 6A to 6C, but it is not limited thereto. The light guide 3 has the first recessed portion 340a and the third recessed portion 340b on the left side surface 34 side, and the second recessed portion 350a and the fourth recessed portion 350b on the right side surface 35 side. The light guide 3 has the protruding portion 37 on the left side surface 34 facing the notched recess 26.

(Assembly of the Lighting Device 1)

Firstly, as shown in FIG. 9A, the light guide 3 is inserted from the first end surface 30 into the insertion hole 225a of the housing 2.

Next, as shown in FIG. 9B, after the light guide 3 is inserted through the insertion hole 225a until the protruding portion 37 moves to the position of the notched recess 26, the protruding portion 37 is fitted to the notched recess 26. The protruding portion 37 comes into contact with an inclined surface 261 of the notched recess 26 at this time, and is then fitted by moving the light guide 3 in a direction toward the insertion hole 225a, i.e., in a direction away from a terminal portion 27 of the housing 2 until a contact surface 370 on the attachment portion 20 side comes into contact with the notch surface 260. The light guide 3 is positioned in the housing 2 by this contact between the contact surface 370 of the protruding portion 37 and the notch surface 260 of the notched recess 26.

Next, as shown in FIG. 10A, the light guide 3 is pushed in a direction toward the bottom surface portion 222c of the housing recess 222 so that the first held portion 36c close to the attachment portion 20 is sandwiched between the lower surface 24c of the first holding portion 249a and the bottom surface portion 222c and the second held portion 36d is sandwiched between the lower surface 24d of the second holding portion 249b and the bottom surface portion 222c.

Next, as shown in FIG. 10B, the light guide 3 is pushed in the direction toward the bottom surface portion 222c of the housing recess 222 so that the third held portion 36e far from the attachment portion 20 is sandwiched between the lower surface 24e of the third holding portion 249c and the bottom surface portion 222c and the fourth held portion 36f is sandwiched between the lower surface 24f of the fourth holding portion 249d and the bottom surface portion 222c.

Next, as shown in FIG. 11, the light source unit 4 is attached to the attachment opening 200 of the attachment portion 20 of the housing 2, and the assembly of the lighting device 1 is thereby completed.

(Effects of the Second Embodiment)

The lighting device 1 in the second embodiment is configured such that attachment of the light source unit 4 can be performed in the state in which the light guide 3 is attached to the housing 2. Therefore, as compared to when the light guide is sandwiched between the housing and the light source unit, the light guide 3 does not easily come off from the housing 2, which makes it easier to work and improves assembly workability.

In the lighting device 1, the notched recess 26 and the protruding portion 37 for positioning the housing 2 and the light guide 3 are provided at a position close to the attachment portion 20. Therefore, as compared to when this configuration is not adopted, it is easier to know how much the light guide 3 should be inserted, which improves workability and also increases the accuracy of the distance between the first end surface 30 and the light-emitting element 41. In addition, since it is easy to know how much the light guide 3 should be inserted, the housing 2 of the lighting device 1 does not need to have a member to stop the movement of the first end surface 30.

In the lighting device 1, it is possible to suppress contact between the light guide 3 and the light source unit 4 since it is easy to know how much the light guide 3 should be inserted. Therefore, it is also possible to attach the light guide 3 to the housing 2 after attaching the light source unit 4 to the housing 2.

In the lighting device 1, positioning can be simply achieved by the notched recess 26 and the protruding portion 37. Therefore, as compared to when this configuration is not adopted, workability of fitting the held portion 36 to the holding portion 24 is improved.

Although some embodiments and modifications of the invention have been described, these embodiments and modifications are merely examples and the invention according to claims is not to be limited thereto. These new embodiments and modifications may be implemented in various other forms, and various omissions, substitutions and changes, etc., can be made without departing from the gist of the invention. In addition, not all combinations of the features described in these embodiments and modifications are necessary to solve the problem of the invention. Further, these embodiments and modifications are included within the scope and gist of the invention and also within the invention described in the claims and the range of equivalency.

Reference Signs List

1 LIGHTING DEVICE
2 HOUSING
3 LIGHT GUIDE
4 LIGHT SOURCE UNIT
5 CONNECTOR PORTION
6 ILLUMINATION TARGET
7 ATTACHMENT TARGET MEMBER 7
9 VEHICLE
10 ILLUMINATION LIGHT
20 ATTACHMENT PORTION
20a SIDE SURFACE
20b SIDE SURFACE
20c FRONT SURFACE
20d BACK SURFACE
20e LOWER SURFACE
22 HOUSING PORTION
22a LOWER SURFACE
24 HOLDING PORTION
24a FIRST HOLDING PORTION
24b SECOND HOLDING PORTION
24c-24f LOWER SURFACE

25 ATTACHMENT PIECE
26 NOTCHED RECESS
27 TERMINAL PORTION
30 FIRST END SURFACE
31 SECOND END SURFACE
32 EMITTING SURFACE
33 OPPOSITE SURFACE
33a GROOVE
34 LEFT SIDE SURFACE
35 RIGHT SIDE SURFACE
36 HELD PORTION
36a FIRST HELD PORTION
36b SECOND HELD PORTION
36c-36f FIRST TO FOURTH HELD PORTIONS
37 PROTRUDING PORTION
40 HOUSING
41 LIGHT-EMITTING ELEMENT
42 LENS
43 LIGHT
44 OPTICAL AXIS
100 ILLUMINATION RANGE
200 ATTACHMENT OPENING
200a, 200b INNER SURFACE
200c UPPER INNER SURFACE
200d BOTTOM SURFACE
200e OPENING
201 GUIDE RIB
202a, 202b THROUGH-HOLE
220 END PORTION
220a END SURFACE
220b, 220c INNER SURFACE
221 INSERTION OPENING
222 HOUSING RECESS
222a FIRST WALL PORTION
222b SECOND WALL PORTION
222c BOTTOM SURFACE PORTION
222d RIB
223 EXPOSURE OPENING
224a-224d FIRST TO FOURTH THROUGH-HOLES
225 CYLINDRICAL PROTRUDING PORTION
225a INSERTION HOLE
240 HOLDING RECESS
241 CLAW PORTION
241a INCLINED SURFACE
242 WALL PORTION
243 LOWER CLAW PORTION
243a INCLINED SURFACE
244 HOLDING RECESS
245 CLAW PORTION
245a INCLINED SURFACE
246 WALL PORTION
247 LOWER CLAW PORTION
247a INCLINED SURFACE
248a, 248b GUIDE RIB
248c INCLINED PORTION
248d RIB
249a-249d FIRST TO FOURTH HOLDING PORTIONS
260 NOTCH SURFACE
261 INCLINED SURFACE
340a FIRST RECESSED PORTION
340b THIRD RECESSED PORTION
350a SECOND RECESSED PORTION
350b FOURTH RECESSED PORTION
370 CONTACT SURFACE
400 FRONT SURFACE
400a CYLINDRICAL PORTION
401 FIRST SIDE SURFACE
401a LIGHT SOURCE UNIT-SIDE CLAW PORTION
402 SECOND SIDE SURFACE
402a LIGHT SOURCE UNIT-SIDE CLAW PORTION
403 LOWER SURFACE

The invention claimed is:

1. A lighting device, comprising:
a light source unit that outputs light;
an elongated light guide comprising a first end surface on which the light is incident, a second end surface located opposite to the first end surface, an emitting surface which comprises one of longitudinal side surfaces intersecting the first and second end surfaces and from which the light is emitted, and at least one held portion provided on at least one of the longitudinal side surfaces different from the emitting surface, the light guide guiding the light from the first end surface to the second end surface; and
a housing comprising an attachment portion to which the light source unit is attached, a housing portion that is open at an end portion on the attachment portion side and comprises a housing recess to house the light guide and an exposure opening exposing the emitting surface, and a holding portion that holds the light guide in the housing recess by sandwiching the at least one held portion,
wherein the attachment portion and the housing portion are integrally formed, and
wherein the holding portion is disposed between the attachment portion and the housing portion.

2. The lighting device according to claim 1,
wherein the held portion is provided on the first end surface side of the light guide, and
wherein the holding portion is provided on the housing recess on the attachment portion side of the housing and comprises a holding recess to which the held portion is fitted, and a claw portion comprising a wall of the holding recess on the attachment portion side, guiding an insertion of the light guide into the housing recess, and further suppressing coming out of the light guide from the housing recess.

3. The lighting device according to claim 2,
wherein the held portion comprises a first held portion protruding from a first side surface adjacent to the emitting surface, and a second held portion protruding from a second side surface located opposite to the first side surface, and
wherein the holding portion comprises a first holding portion to hold the first held portion and a second holding portion to hold the second held portion.

4. The lighting device according to claim 1,
wherein a length of the emitting surface in a lateral direction is longer than a length of an opposite surface of the light guide that is located opposite to the emitting surface.

5. A lighting device, comprising:
a light source unit that outputs light;
an elongated light guide comprising a first end surface on which the light is incident, a second end surface located opposite to the first end surface, an emitting surface which comprises one of longitudinal side surfaces intersecting the first and second end surfaces and from which the light is emitted, and at least one held portion provided on at least one of the longitudinal side surfaces different from the emitting surface, the light guide guiding the light from the first end surface to the second end surface; and a housing comprising an attachment portion to which the light source unit is attached, a housing portion that is open at an end portion on the attachment portion side and comprises a housing recess to house the light guide and an exposure opening exposing the emitting surface, and a holding portion that holds the light guide in the housing recess by sandwiching the at least one held portion, wherein the held portion comprises a bottom portion of a recessed portion comprising an indentation provided on at least one of a first side surface adjacent to the emitting surface and a second side surface located opposite to the first side surface, and wherein the holding portion comprises a raised portion provided so as to correspond to the held portion and protruding toward inside of the housing recess from at least one of first and second wall portions forming the housing recess, and holds the light guide in the housing recess by sandwiching the held portion as the bottom portion of the recessed portion between a bottom surface portion of the housing recess and a lower surface of the raised portion.

6. The lighting device according to claim 5, wherein the held portion comprises a first held portion that comprises a bottom portion of a first recessed portion comprising an indentation provided on the first side surface, and a second held portion that is located opposite to the first held portion and comprises a bottom portion of a second recessed portion comprising an indentation provided on the second side surface, and wherein the holding portion comprises a first holding portion provided so as to correspond to the first held portion and a second holding portion located opposite to the first holding portion and provided so as to correspond to the second held portion.

7. The lighting device according to claim 6, wherein the housing recess comprises a through-hole comprising a hole formed at least either between the first wall portion and the bottom surface portion or between the second wall portion and the bottom surface portion, so as to correspond to the position of the held portion.

8. The lighting device according to claim 7, wherein the housing recess comprises at least one notched recess having a shape formed by partially cutting out at least one of the first and second wall portions, wherein the light guide comprises at least one protruding portion provided so as to correspond to the notched recess, and wherein the protruding portion is inserted into the notched recess, comes into contact with a notch surface of the notched recess on the housing portion side, and is thereby positioned with respect to the housing recess.

9. The lighting device according to claim 5, wherein the housing recess comprises a plurality of ribs on the bottom surface portion, the ribs being in contact with the opposite surface located opposite to the emitting surface.

\* \* \* \* \*